March 25, 1952     L. J. MICKELSON     2,590,558
FISHING LURE
Filed July 3, 1950
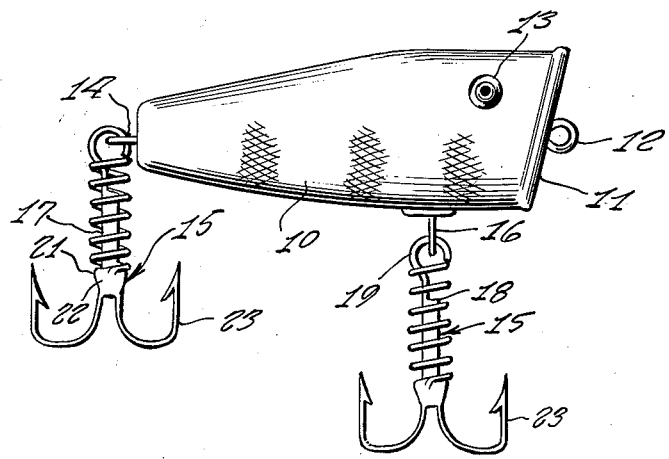
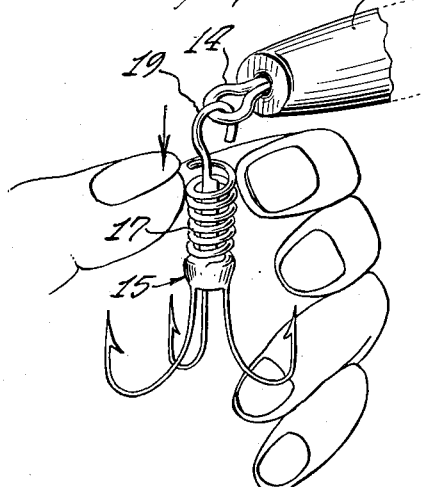
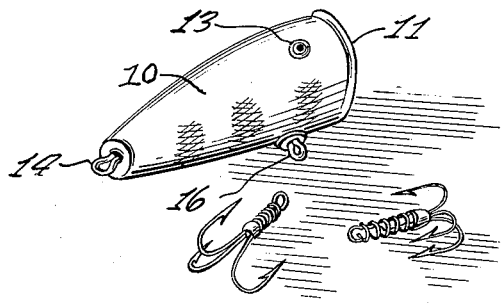
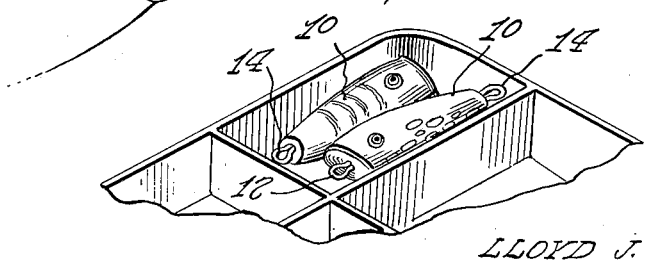
INVENTOR.
LLOYD J. MICKELSON
BY
Carl Miller
ATTORNEY Patented Mar. 25, 1952

2,590,558

UNITED STATES PATENT OFFICE 2,590,558

FISHING LURE

Lloyd J. Mickelson, St. Clair Shores, Mich., assignor to Carl Miller, New York, N. Y.

Application July 3, 1950, Serial No. 171,805

2 Claims. (Cl. 43—44.83)

This invention relates to a fishing lure and more particularly to the construction of a hook therefor.

It is an object of the present invention to provide a hook for a fishing lure wherein a spring is provided about the hook shank to make secure the hook upon the eye of the lure body.

Other objects of the present invention are to provide a fish hook construction of the above type which is simple, inexpensive to manufacture, easy to operate, compact and efficient in operation.

For other objects and for a better understanding of the invention, reference may be had to the following detailed description taken in connection with the accompanying drawing, in which Fig. 1 is a side elevational view of the lure having the hook arrangement of the present invention connected thereto.

Fig. 2 is a rear perspective view of the fish lure and of the fish hook and illustrating the manner in which the spring of the hook is released to remove it.

Fig. 3 is a perspective view of the fish lure body and of two of the hooks free thereof.

Fig. 4 is a fragmentary perspective view of the fish lure body stored in a fish tray compartment.

Referring now to the figures, 10 represents a fish lure body having a flat forward end 11 with a pull eye 12 thereon. A fish eye 13 is provided in the side of the body. The body is tapered rearwardly and has an eye 14 therein for the attachment of a hook 15. On the under side of the body is an eye 16 to which another hook 15 may be attached.

The hook 15 comprises a shank 17 that is relieved at 18 to provide a hook end 19 which may pass through either of the eyes 14 or 16 of the lure body. The spring is integrally secured at its lower end, as indicated at 21, to a bottom 22 which integrally carries a plurality or cluster of fish hook prongs 23. The spring 17 is sufficiently long as to have its upper end bear against the attaching hook formation 19 so as to prevent the severance of the hook arrangement 15 from the eyes on the lure body.

To effect the detachment of the hook arrangement from the lure body, the upper end of the spring 17 is depressed in the manner as shown in Fig. 2 so as to free the bent end 19 and permit the easy removal of the hook arrangement from the eye. Thus it will be seen that to remove the hook it is only necessary to push down on the top of the spring with the thumb nail and lift the hook assembly from the lure body.

A similar operation is effected when attaching the assembly to the lure body. It is merely necessary to depress the spring so that the hook can be extended over the eye.

It will be understood that the hook assembly can have any number of hook formations thereon.

While various changes may be made in the detail construction, it shall be understood that such changes shall be within the spirit and scope of the present invention as defined by the appended claims.

Having thus set forth and disclosed the nature of my invention, what is claimed is:

1. A fish hook construction comprising an upwardly extending shank terminating at the upper end in a suspension hook adapted to be connected to a lure body, a base portion of greater cross section than that of said shank fixed upon the lower end of the latter, a plurality of hook prongs fixed to the lower portion of the base and individually directed outward therefrom, and a compression spring surrounding said shank and fixed at the lower end thereof to said base and at the upper end normally bearing resiliently against the end of said suspension hook to prevent accidental displacement of said hook from said lure body.

2. A fish hook construction comprising an upwardly extending elongated shank relieved at the upper portion thereof and at the upper end beyond the relieved portion terminating in a suspension hook adapted to be connected to a lure body, an enlarged base portion integral upon the lower end of the shank, a plurality of hook prongs integral with the lower portion of said base portion and individually extending outwardly therefrom, and a coil spring integral at the lower end thereof with the enlarged base portion and extending upwardly from the latter about said shank to said suspension hook to normally engage the latter resiliently to close it.

LLOYD J. MICKELSON.

REFERENCES CITED

The following references are of record in the file of this patent:

UNITED STATES PATENTS

| Number | Name | Date |
|---|---|---|
| 1,490,251 | Adams | Apr. 15, 1924 |
| 1,526,133 | Gilmore | Feb. 10, 1925 |

FOREIGN PATENTS

| Number | Country | Date |
|---|---|---|
| 452,888 | France | Mar. 20, 1913 |